US007245143B2

(12) United States Patent
Hasegawa et al.

(10) Patent No.: US 7,245,143 B2
(45) Date of Patent: Jul. 17, 2007

(54) ELECTRO-OPTICAL DEVICE, ELECTRONIC APPARATUS, AND MOUNTING STRUCTURE

(75) Inventors: Kenichi Hasegawa, Matsumoto (JP); Atsunari Tsuda, Suwa (JP)

(73) Assignee: Seiko Epson Corporation (JP)

( * ) Notice: Subject to any disclaimer, the term of this patent is extended or adjusted under 35 U.S.C. 154(b) by 48 days.

(21) Appl. No.: 11/159,728

(22) Filed: Jun. 23, 2005

(65) Prior Publication Data

US 2006/0038580 A1    Feb. 23, 2006

(30) Foreign Application Priority Data

Jul. 23, 2004   (JP)   ............................. 2004-215330

(51) Int. Cl.
 *G01R 31/28*    (2006.01)
(52) U.S. Cl. .................................... 324/770
(58) Field of Classification Search ................ 324/96, 324/763, 765, 158.1, 500, 537, 512, 528, 324/531, 557, 691; 398/9, 10, 16, 17; 708/831; 257/350, 734, 786, 781; 359/330
 See application file for complete search history.

(56) References Cited

U.S. PATENT DOCUMENTS

| | | | | |
|---|---|---|---|---|
| 4,835,466 A | * | 5/1989 | Maly et al. ................. | 324/537 |
| 5,969,532 A | * | 10/1999 | Usui et al. .................. | 324/557 |
| 5,994,916 A | * | 11/1999 | Hayashi ..................... | 324/770 |
| 6,291,834 B1 | * | 9/2001 | Hasegawa ................... | 257/48 |
| 6,420,883 B1 | * | 7/2002 | Watanabe et al. ........... | 324/691 |

FOREIGN PATENT DOCUMENTS

| | | |
|---|---|---|
| JP | 01-232326 | 9/1989 |
| JP | 05-315418 | 11/1993 |
| JP | 05-346587 | 12/1993 |
| JP | 06-082802 | 3/1994 |
| JP | 2000-276369 | 10/2000 |
| JP | 2003-057677 | 2/2003 |

* cited by examiner

*Primary Examiner*—Ha Tran Nguyen
*Assistant Examiner*—Tung X. Nguyen
(74) *Attorney, Agent, or Firm*—Harness, Dickey & Pierce, P.L.C.

(57) ABSTRACT

An electro-optical device includes a first substrate that holds an electro-optical material, a first IC that is mounted on the first substrate and that has a plurality of first terminals, a plurality of second terminals formed on the first substrate to be connected to the first terminals, respectively, a plurality of wiring lines formed on the first substrate, first substrate crack diagnostic terminal pairs that are included in the plurality of the first terminals and that are used for diagnosing whether a crack occurs in the first substrate, second substrate crack diagnostic terminal pairs that are included in the plurality of second terminals and that are connected to the first substrate crack diagnostic terminal pairs, respectively, a substrate crack diagnostic conductive pattern that connects the second substrate crack diagnostic terminal pairs and that extends around an outer periphery of the first substrate, a substrate crack diagnostic unit provided in the first IC to diagnose whether the first substrate crack diagnostic terminal pairs are electrically connected to each other, and a substrate crack diagnosis result output unit provided in the first IC to output a diagnosis result obtained by the substrate crack diagnostic unit.

10 Claims, 8 Drawing Sheets

ELECTRO-OPTICAL DEVICE, ELECTRONIC APPARATUS, AND MOUNTING STRUCTURE

RELATED APPLICATIONS

This application claims priority to Japanese Patent Application No. 2004-215330 filed Jul. 23, 2004 which is hereby expressly incorporated by reference herein in its entirety.

BACKGROUND OF THE INVENTION

1. Technical Field

The present invention relates to an electro-optical device, an electronic apparatus having the same, and a mounting structure in which a member is mounted on a mounting substrate, and more particularly, to a technique of performing diagnosis of an electro-optical device and a mounting structure.

2. Related Art

In general, in electro-optical devices, such as active matrix liquid crystal devices, a driving IC and a flexible substrate are mounted on an electro-optical device substrate holding an electro-optical material, and each pixel is driven by signals output from the driving IC or signals generated based on the signals output from the driving IC (for example, see Japanese Unexamined Patent Application Publication No. 2003-57677)

Further, an electro-optical device substrate or a flexible substrate also has a power supply IC, an EPROM, an IC for driving an LED for a backlight, etc., mounted thereon, in addition to the driving IC. However, when a defect occurs in any one of these ICs, a great deal of labor is required to pinpoint the cause of the defect. Therefore, there has been proposed a technique of providing an IC with a self-diagnostic function (for example, see Japanese Unexamined Patent Application Publication No. 5-315418).

In an electro-optical device disclosed in Japanese Unexamined Patent Application Publication No. 2003-57677, an electro-optical device substrate is composed of a rigid substrate, such as a glass substrate. When a crack occurs in this substrate, various wiring lines are broken, which results in defects in display. However, it is difficult to find such a connection defect even if an IC having the self-diagnostic function is provided, as described in Japanese Unexamined Patent Application Publication No. 5-315418.

Further, in a case in which a plurality of ICs is mounted on an electro-optical device substrate or a flexible substrate, when each of the plurality of ICs has a self-diagnostic function, it is necessary for each of the plurality of ICs to output self-diagnosis results, which causes a circuit structure to become complicated.

SUMMARY

An advantage of the invention is that it provides an electro-optical device, an electronic apparatus having the same, and a mounting structure capable of easily diagnosing whether a crack occurs in a substrate on which ICs are mounted directly or through a wiring substrate.

Further, another advantage of the invention is that it provides an electro-optical device, an electronic apparatus having the same, and a mounting structure capable of easily performing the diagnosis of a plurality of ICs with a simple structure even though the plurality of ICs is mounted.

According to a first aspect of the invention, an electro-optical device includes a first substrate that holds an electro-optical material, a first IC that is mounted on the first substrate and that has a plurality of first terminals, a plurality of second terminals formed on the first substrate to be connected to the first terminals, respectively, a plurality of wiring lines formed on the first substrate, first substrate crack diagnostic terminal pairs that are included in the plurality of the first terminals and that are used for diagnosing whether a crack occurs in the first substrate, second substrate crack diagnostic terminal pairs that are included in the plurality of second terminals and that are connected to the first substrate crack diagnostic terminal pairs, respectively, a substrate crack diagnostic conductive pattern that connects the second substrate crack diagnostic terminal pairs and that extends around an outer periphery of the first substrate, a substrate crack diagnostic unit provided in the first IC to diagnose whether the first substrate crack diagnostic terminal pairs are electrically connected to each other, and a substrate crack diagnosis result output unit provided in the first IC to output a diagnosis result obtained by the substrate crack diagnostic unit.

According to this structure, when a crack occurs in the first substrate, so that the substrate crack diagnostic conductive pattern is broken, the first substrate crack diagnostic terminal pairs are electrically disconnected from each other. Therefore, when the first substrate crack diagnostic terminal pairs are electrically connected to each other, the substrate crack diagnostic unit determines that no crack occurs in the substrate. On the other side, when the first substrate crack diagnostic terminal pairs are electrically disconnected from each other, the substrate crack diagnostic unit determines that a crack occurs in the substrate, and the substrate crack diagnosis result output unit outputs the diagnosis result. Thus, when a defect occurs in an electro-optical device, it is possible to easily determine whether the defect is caused by the crack of the first substrate.

According to a second aspect of the invention, an electro-optical device includes a first substrate that holds an electro-optical material, a wiring substrate that is mounted on the first substrate and that has a plurality of first terminals and a first IC thereon, a plurality of second terminals formed on the first substrate to be connected to the first terminals, respectively, a plurality of wiring lines formed on the first substrate, first substrate crack diagnostic terminal pairs that are included in the plurality of the first terminals and that are used for diagnosing whether a crack occurs in the first substrate, second substrate crack diagnostic terminal pairs that are included in the plurality of second terminals and that are connected to the first substrate crack diagnostic terminal pairs, respectively, a substrate crack diagnostic conductive pattern that connects the second substrate crack diagnostic terminal pairs and that extends around an outer periphery of the first substrate, a substrate crack diagnostic unit provided in the first IC to diagnose whether the first substrate crack diagnostic terminal pairs are electrically connected to each other, and a substrate crack diagnosis result output unit provided in the first IC to output a diagnosis result obtained by the substrate crack diagnostic unit.

According to this structure, when a crack occurs in the first substrate, so that the substrate crack diagnostic conductive pattern is broken, the first substrate crack diagnostic terminal pairs are electrically disconnected from each other. Therefore, when the first substrate crack diagnostic terminal pairs are electrically connected to each other, the substrate crack diagnostic unit determines that no crack occurs in the substrate. On the other side, when the first substrate crack diagnostic terminal pairs are electrically disconnected from each other, the substrate crack diagnostic unit determines that a crack occurs in the substrate, and the substrate crack diagnosis result output unit outputs the diagnosis result. Thus, when a defect occurs in an electro-optical device, it is possible to easily determine whether the defect is caused by the crack of the first substrate.

Furthermore, it is preferable that the wiring substrate be, for example, a flexible substrate and that the first substrate be, for example, a rigid substrate.

Moreover, it is preferable that, when the electro-optical device is a liquid crystal device, the electro-optical device further include a second substrate opposite to the first substrate with the electro-optical material interposed therebetween.

In this case, it is preferable that the first and second substrates each have intersubstrate connecting terminals thereon, and be bonded to each other with an intersubstrate conductive material interposed therebetween, so that the intersubstrate connecting terminals are electrically connected to each other. In addition, it is preferable that the second substrate crack diagnostic terminal pairs be formed on the first substrate only, and that the substrate crack diagnostic conductive patters be formed on both of the first and second substrates, respectively. Further, it is preferable that the substrate crack diagnostic conductive patterns respectively formed on the first and second substrates be electrically connected to each other in series between the second substrate crack diagnostic terminal pairs by the intersubstrate conductive material and the interlayer connecting terminals.

Furthermore, it is preferable that one or more second ICs be mounted on the first substrate or the second substrate, that information as to whether the second ICs can be normally operated be input from the second ICs to the first IC, and that the information or diagnosis results of the second ICs based on the information be output from the first IC. According to this structure, even if a plurality of ICs is mounted, it is not necessary to allow each of the plurality of ICs to have a self-diagnostic function and to output a self-diagnosis result. Therefore, it is possible to perform the diagnosis of a plurality of ICs with a simple structure.

Further, it is preferable that signals output from the first IC be applied to the plurality of wiring lines.

Furthermore, according to a third aspect of the invention, the electro-optical device is used for portable electronic apparatuses, such as a mobile computer and a mobile phone, and electronic apparatuses equipped with a direct-view-type display device and a projection display device.

The invention can be applied to various mounting structures, in addition to the electro-optical device. That is, according to a fourth aspect of the invention, a mounting structure includes a first IC having a plurality of first terminals, a first substrate that has a plurality of wiring lines and a plurality of second terminals respectively connected to the plurality of first terminals thereon and that has the first IC mounted thereon, first substrate crack diagnostic terminal pairs that are included in the plurality of the first terminals and that are used for diagnosing whether a crack occurs in the first substrate, second substrate crack diagnostic terminal pairs that are included in the plurality of second terminals and that are connected to the first substrate crack diagnostic terminal pairs, respectively, a substrate crack diagnostic conductive pattern that connects the second substrate crack diagnostic terminal pairs and that extends around an outer periphery of the first substrate, a substrate crack diagnostic unit provided in the first IC to diagnose whether the first substrate crack diagnostic terminal pairs are electrically connected to each other, and a substrate crack diagnosis result output unit provided in the first IC to output a diagnosis result obtained by the substrate crack diagnostic unit.

According to this structure, when a crack occurs in the first substrate, so that the substrate crack diagnostic conductive pattern is broken, the first substrate crack diagnostic terminal pairs are electrically disconnected from each other. Therefore, when the first substrate crack diagnostic terminal pairs are electrically connected to each other, the substrate crack diagnostic unit determines that no crack occurs in the substrate. On the other side, when the first substrate crack diagnostic terminal pairs are electrically disconnected from each other, the substrate crack diagnostic unit determines that a crack occurs in the substrate, and the substrate crack diagnosis result output unit outputs the diagnosis result. Thus, when a defect occurs in an electro-optical device, it is possible to easily determine whether the defect is caused by the crack of the first substrate.

Further, according to a fifth aspect of the invention, a mounting structure includes a wiring substrate that has a plurality of first terminals thereon and that has a first IC mounted thereon, a first substrate that has a plurality of wiring lines and a plurality of second terminals respectively connected to the plurality of first terminals thereon and that has the wiring substrate mounted thereon, first substrate crack diagnostic terminal pairs that are included in the plurality of the first terminals and that are used for diagnosing whether a crack occurs in the first substrate, second substrate crack diagnostic terminal pairs that are included in the plurality of second terminals and that are connected to the first substrate crack diagnostic terminal pairs, respectively, a substrate crack diagnostic conductive pattern that connects the second substrate crack diagnostic terminal pairs and that extends around an outer periphery of the first substrate, a substrate crack diagnostic unit provided in the first IC to diagnose whether the first substrate crack diagnostic terminal pairs are electrically connected to each other, and a substrate crack diagnosis result output unit provided in the first IC to output a diagnosis result obtained by the substrate crack diagnostic unit.

According to this structure, when a crack occurs in the first substrate, so that the substrate crack diagnostic conductive pattern is broken, the first substrate crack diagnostic terminal pairs are electrically disconnected from each other. Therefore, when the first substrate crack diagnostic terminal pairs are electrically connected to each other, the substrate crack diagnostic unit determines that no crack occurs in the substrate. On the other side, when the first substrate crack diagnostic terminal pairs are electrically disconnected from each other, the substrate crack diagnostic unit determines that a crack occurs in the substrate, and the substrate crack diagnosis result output unit outputs the diagnosis result. Thus, when a defect occurs in an electro-optical device, it is possible to easily determine whether the defect is caused by the crack of the first substrate.

BRIEF DESCRIPTION OF THE DRAWINGS

The invention will be described with reference to the accompanying drawings, wherein like numbers reference like elements, and wherein.

DESCRIPTION OF THE EMBODIMENTS

Hereinafter, preferred embodiments of the invention will be described with reference to the accompanying drawings.

First Embodiment

Overall Structure of Electro-Optical Device

Figure 1:
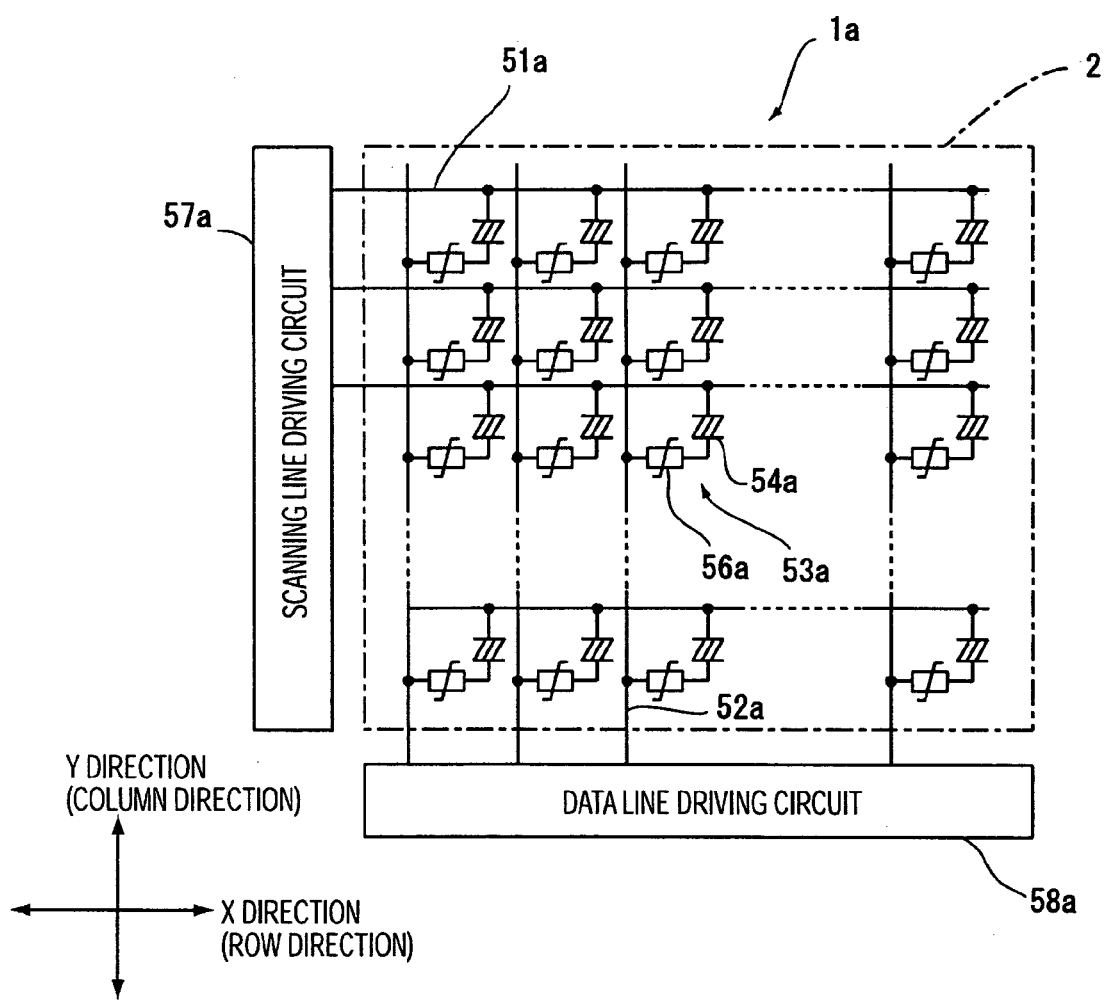
FIG. 1 is a block diagram schematically illustrating the structure of an electro-optical device composed of an active matrix liquid crystal device using TFDs as pixel switching elements.
Figure 2A:
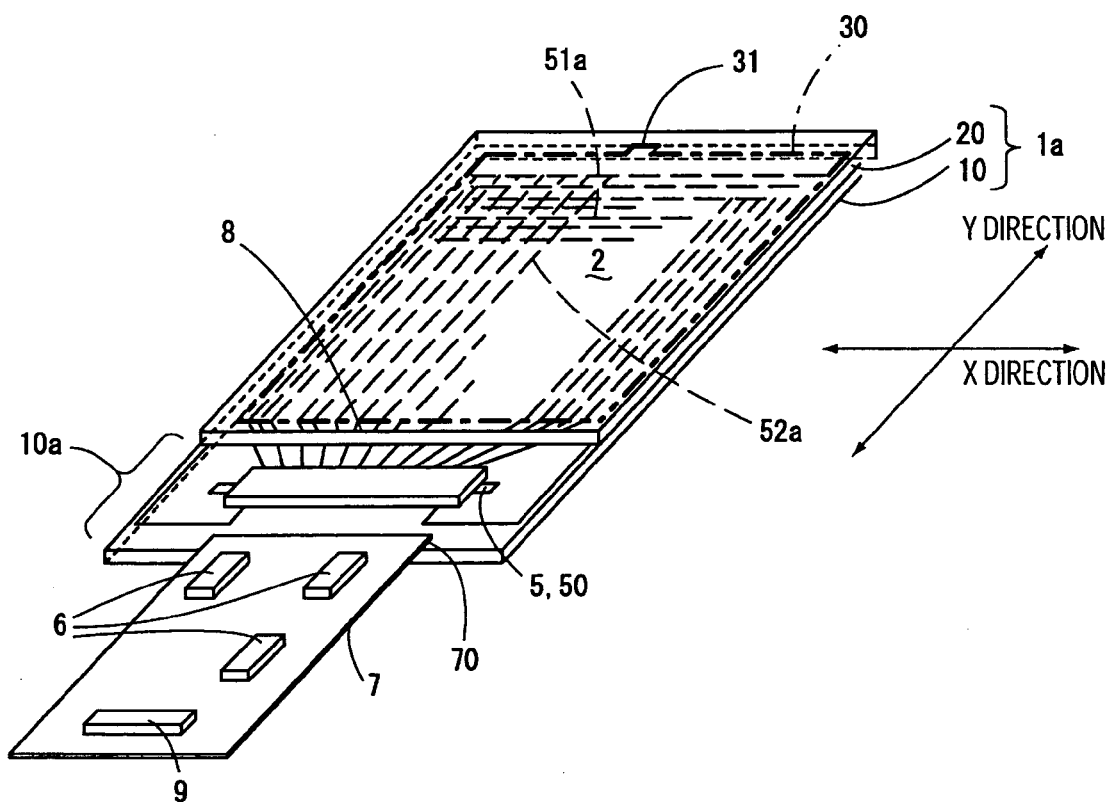
FIG. 2A is a schematic perspective view of the electro-optical device according to the invention, as viewed from a counter substrate.

FIG. 1 is a block diagram illustrating the electrical structure of an electro-optical device. FIG. 2A is a schematic perspective view illustrating an electro-optical device according to an embodiment of the invention, as viewed from a counter substrate, and FIG. 2B is a cross-sectional view taken along the Y direction of the electro-optical device to pass through pixel electrodes.

An electro-optical device 1a shown in FIG. 1 is an active matrix liquid crystal device using thin film diodes (TFDs) as pixel switching elements. In an image display region 2 of the electro-optical device 1a, when two directions orthogonal to each other are the X direction and the Y direction, a plurality of scanning lines 51a extends in the X direction (row direction), and a plurality of data lines 52a extends in the Y direction (column direction). Also, in the image display region 2 of the electro-optical device 1a, a plurality of pixels 53a are formed corresponding to intersections of the scanning lines 51a and the data lines 52a, and the plurality of pixels 53a are arranged in a matrix. In these pixels 53a, liquid crystal layers 54a and pixel switching TFDs 56a are connected to each other in series. The scanning lines 51a are driven by a scanning line driving circuit 57a, and the data lines 52a are driven by a data line driving circuit 58a.

Figure 2B:
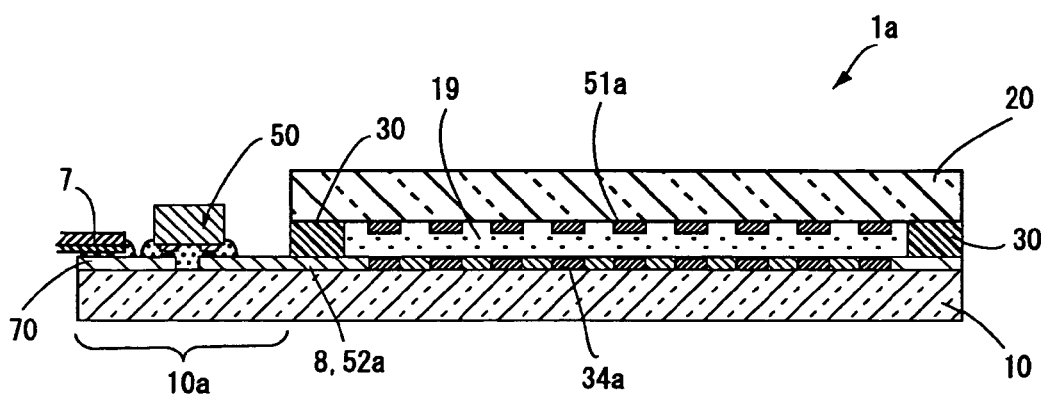
FIG. 2B is a cross-sectional view taken along the Y direction of the electro-optical device to pass through pixel electrodes.

In the structure of the electro-optical device 1a, as shown in FIGS. 2A and 2B, an element substrate 10 (an electro-optical device substrate/a first substrate) and a counter substrate 20 (an electro-optical device substrate/a second substrate) are bonded to each other by a sealing member 30, and liquid crystal 19, serving as an electro-optical material, is injected into a region surrounded by the two substrates and the sealing member 30. The sealing member 30 is formed substantially in a rectangular frame shape around the outer periphery of the counter substrate 20, and a portion of the sealing member 30 is opened so that the liquid crystal 19 can be injected thereinto. After the liquid crystal 19 is injected, the opened portion is sealed by a sealant 31.

The element substrate 10 and the counter substrate 20 are plate-shaped members made of a transmissive material, such as glass or quartz. The plurality of data lines 52a, the pixel switching TFDS (not shown), pixel electrodes 34a, an alignment film (not shown), etc., are formed on an inner surface (a surface facing the liquid crystal 19) of the element substrate 10. Meanwhile, the plurality of scanning lines 51a is formed on an inner surface of the counter substrate 20, and an alignment film (not shown) is formed on the scanning lines 51a.

Further, polarizing plates for polarizing incident light, retardation plates for compensating for interference colors, etc., are properly bonded to the outer surfaces of the element substrate 10 and the counter substrate 20, respectively. In addition, when color display is performed, R (red), G (green), and B (blue) filters (not shown) are formed in a predetermined arrangement in regions on the counter substrate 20 opposite to the pixel electrodes 34a, and a black matrix (not shown) is formed in regions not opposite to the pixel electrodes 34a. Further, on the surface having the color filters and the black matrix thereon, a planarizing layer for planarizing and protecting the surface is coated, and the scanning lines 51a are formed on the planarizing layer. However, since the above-mentioned components are not directly related to the invention, the description and illustration thereof will be omitted.

In the electro-optical device 1a of the present embodiment, the element substrate 10 has a projecting region 10a protruding from one side of the outer periphery of the sealing member 30 in a state in which the element substrate 10 and the counter substrate 20 are bonded to each other by the sealing member 30. Conductive patterns 8 integrated with the data lines 52a and other conductive patterns 8 electrically connected to the scanning lines 51a by electrical connection between the substrates extend toward the projecting region 10a. In order to perform electrical connection between the substrates, resin containing a plurality of conductive particles therein is used as the sealing member 30. For example, plastic particles coated with a metallic material, or resin particles having conductivity are used as the conductive particles functioning to electrically connect intersubstrate conductive terminals (end portions of wiring patterns) respectively formed on the element substrate 10 and the counter substrate 20. Therefore, in the present embodiment, a driving IC 5 (a first IC) for respectively outputting image signals and scanning signals to the data lines 52a and the scanning lines 51a is mounted on only the element substrate 10 in a COG manner, and a flexible substrate 7 (a wiring substrate) is connected to the element substrate 10. That is, an IC mounting region 50 is formed in the projecting region 10a of the element substrate, and the driving IC 5 is mounted in the IC mounting region 50. In addition, in the projecting region 10a of the element substrate 10, a substrate connecting region 70 is provided at a position closer to a substrate edge 11 than to the IC mounting region 50, and the flexible substrate 7 is connected to the substrate connecting region 70. Further, the flexible substrate 7 has a plurality of auxiliary ICs 6 (second ICs), such as a power supply IC, an EPROM, an IC for driving an LED for a backlight, mounted thereon. In addition, the flexible substrate 7 has a connector 9 for electrical connection with a main body of an electronic apparatus mounted thereon.

Structure of Connection-State-Diagnostic Function

Figure 3:
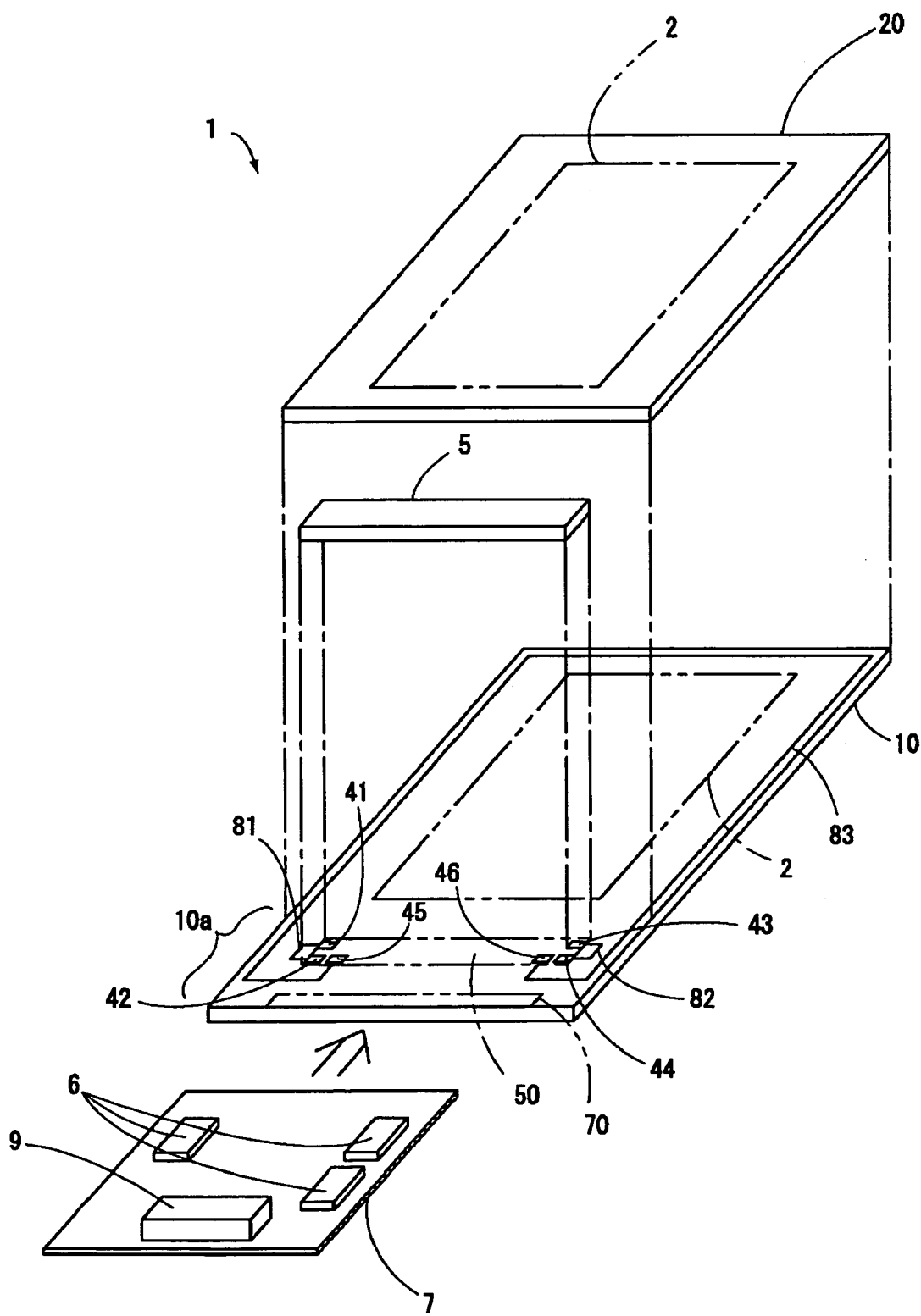
FIG. 3 is an explanatory diagram illustrating a self-diagnostic structure among various components of an electro-optical device according to a first embodiment of the invention.
Figure 4:
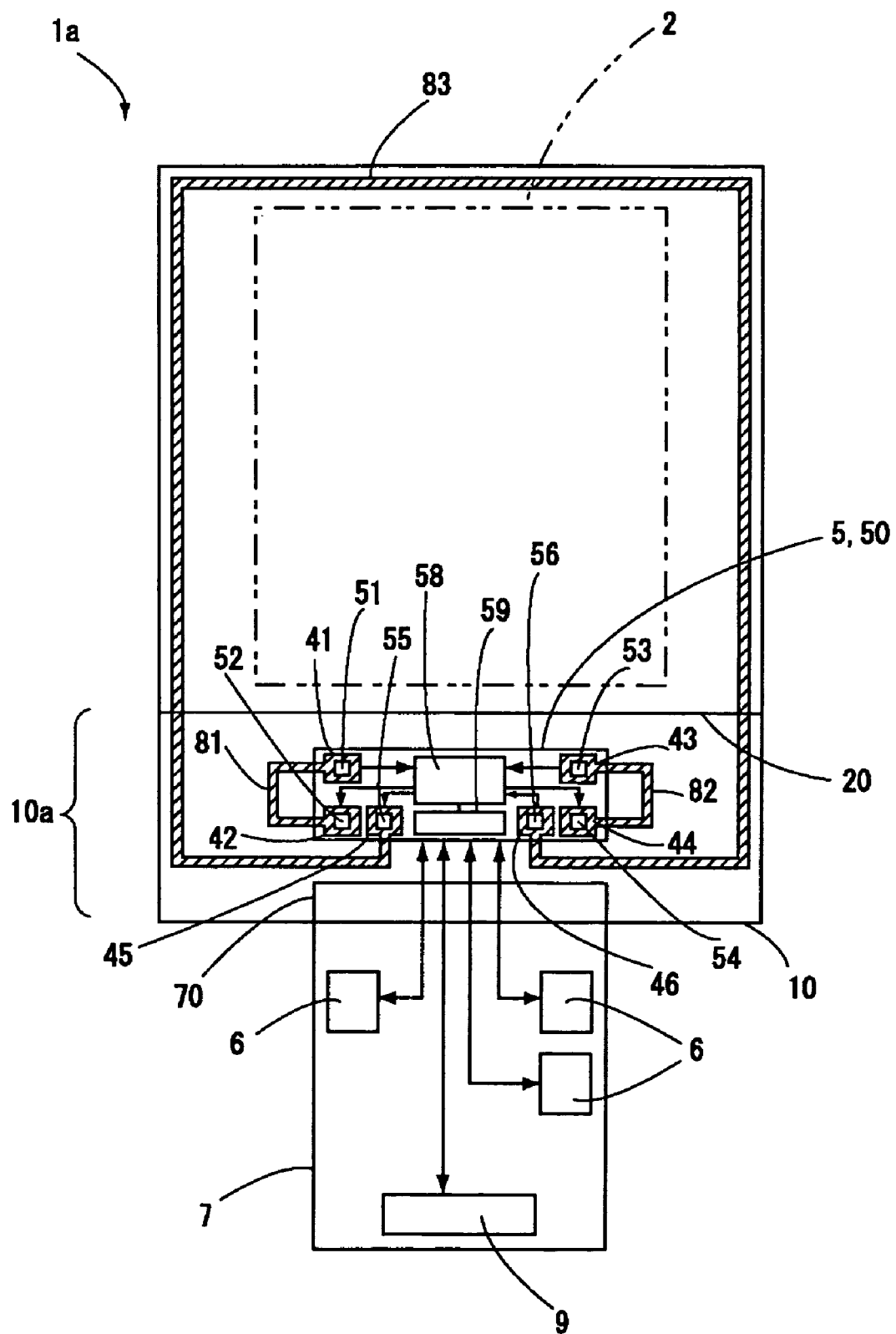
FIG. 4 is a plan view illustrating the self-diagnostic structure among various components of the electro-optical device according to the first embodiment of the invention.

FIGS. 3 and 4 are explanatory diagrams illustrating a self-diagnostic structure among various components of the electro-optical device according to the present embodiment.

Referring to FIGS. 3 and 4, in the electro-optical device 1a, the driving IC 5 has a plurality of bumps (first terminals), and a plurality of pads (second terminals) are provided in the IC mounting region of the element substrate 10. In addition, the bumps of the driving IC 5 are respectively connected to the pads of the element substrate 10 through an anisotropic conductive material by, for example, a pressing method.

In the present embodiment, among the plurality of bumps of the driving IC 5, bumps 51, 52, 53, and 54 positioned at both ends of an active surface (a surface formed with terminals) thereof are used for diagnosing electrical connection between the bumps of the driving IC and the pads of the element substrate 10. In addition, the bumps 51 and 52 constitute a first connection state diagnostic terminal pair, and the bumps 53 and 54 constitute another first connection state diagnostic terminal pair.

On the other side, among the plurality of pads formed on the element substrate 10, pads 41 and 42 connected to the first connection state diagnostic terminal pair composed of the bumps 51 and 52 constitute a second connection state diagnostic terminal pair, and pads 43 and 44 connected to the first connection state diagnostic terminal pair composed of the bumps 53 and 54 constitute another second connection state diagnostic terminal pair. In addition, the pads 41 and 42 are connected to each other by a connection state diagnostic conductive pattern 81 formed on the element substrate 10, and the pads 43 and 44 are connected to each other by a connection state diagnostic conductive pattern 82 formed on the element substrate 10. These connection state diagnostic conductive patterns 81 and 82 are simultaneously formed with the data lines 52a.

Further, a diagnostic unit 58 is formed in the driving IC 5, and the diagnostic unit 58, serving as a connection state diagnostic unit, outputs predetermined signals to the bumps 52 and 54 and receives signals from the bumps 51 and 53. Therefore, when good connection (pressing) is made both between the bump 51 and the pad 41 and between the bump 52 and the pad 42, the signal output from the diagnostic unit 58 to the bump 52 is input to the diagnostic unit 58 as it is, via the pad 42, the connection state diagnostic conductive pattern 81, the pad 41, and the bump 51. On the other hand, when poor connection is made between the bump 51 and the pad 41 or between the bump 52 and the pad 42, the signal output from the diagnostic unit 58 to the bump 52 is not input from the bump 51 to the diagnostic unit 58. Similarly, when good connection is made both between the bump 53 and the pad 43 and between the bump 54 and the pad 44, the signal output from the diagnostic unit 58 to the bump 54 is input to the diagnostic unit 58 as it is, via the pad 44, the connection state diagnostic conductive pattern 82, the pad 43, and the bump 53. On the contrary, when poor connection is made between the bump 53 and the pad 43 or between the bump 54 and the pad 44, the signal output from the diagnostic unit 58 to the bump 54 is not input from the bump 53 to the diagnostic unit 58.

In this way, the diagnostic unit 58 can diagnose the connection state between the bumps and the pads, and a diagnosis result output unit 59, serving as a connection state diagnosis result output unit, can output the diagnosis result to the outside through the connector 9 of the flexible substrate 7. In addition, the diagnostic unit 58 can output the diagnosis result of the connection state between the bumps and the pads to the data lines 52a to display it on the image display region 2. Thus, when a defect occurs in the electro-optical device 1a, it is possible to easily determine whether the defect is caused by the mounting of the driving IC 5 on the element substrate 10.

Further, in the present embodiment, since the bumps 51, 52, 53, and 54, serving as first connection state diagnostic terminals, are respectively formed at both ends of the active surface of the driving IC 5, it is possible to reliably diagnose the connection state of the driving IC 5 to the element substrate 10. That is, when the driving IC 5 is mounted, defects can easily occur at both ends thereof. Therefore, if the first connection state diagnostic terminal pairs (the bumps 51, 52, 53, and 54) are respectively arranged at both ends of the active surface, it is possible to reliably diagnose the mounting state of the driving IC 5 on the element substrate 10.

Furthermore, the diagnosis result of the connection state can be informed, for example, in the form of the lighting of a predetermined lamp. In addition, the diagnosis of the connection state can be performed by a user's instruction (operation), or self-diagnosis thereof can be automatically performed at regular intervals.

Structure of Substrate Crack Diagnostic Function

In the electro-optical device 1a of the present embodiment, since a glass substrate is used as the element substrate 10, the element substrate 10 may be cracked by an external impact during or after manufacture. Therefore, in the present embodiment, as described below, it is possible to self-diagnose whether a crack occurs in the element substrate 10.

That is, in the electro-optical device 1a of the present embodiment, first, among the plurality of bumps of the driving IC 5, bumps 55 and 56 positioned at both ends of the active surface (the surface formed with terminals) function to diagnose the crack of the element substrate 10, and constitute a first substrate crack diagnostic terminal pair.

On the other hand, among the plurality of pads formed on the element substrate 10, pads 45 and 46 connected to the first substrate crack diagnostic terminal pair composed of the bumps 55 and 56 constitute a second substrate crack diagnostic terminal pair. In addition, the pads 45 and 46 are connected to each other by a thin substrate crack diagnostic conductive pattern 83 formed around the outer periphery of the element substrate 10. This substrate crack diagnostic conductive pattern 83 is simultaneously formed with the data lines 52a.

Further, the diagnostic unit 58 of the driving IC 5, serving as a substrate crack diagnostic unit, outputs a predetermined signal to the bump 55 and receives a signal from the bump 56. Therefore, when no crack occurs in the element substrate 10, so that the substrate crack diagnostic conductive pattern 83 is not broken, the signal output from the diagnostic unit 58 to the bump 55 is input to the diagnostic unit 58 as it is, via the pad 45, the substrate crack diagnostic conductive pattern 83, the pad 46, and the bump 56. On the other hand, when a crack occurs in the element substrate 10, so that the substrate crack diagnostic conductive pattern 83 is broken, the signal output from the diagnostic unit 58 to the bump 55 is not input from the bump 56 to the diagnostic unit 58.

In this way, the diagnostic unit 58 can determine whether a crack occurs in the element substrate 10, based on whether the substrate crack diagnostic conductive pattern 83 is broken, and the diagnosis result output unit 59, serving as a substrate crack diagnosis result output unit, can output the diagnosis result to the outside through the connector 9 of the flexible substrate 7. In addition, the diagnostic unit 58 can output the diagnosis result of the substrate crack to the data lines 52*a* to display it on the image display region 2. Thus, when a defect occurs in the electro-optical device 1*a*, it is possible to easily determine whether the data lines 52*a* and the scanning lines 51*a* are broken due to the crack of the element substrate 10.

Furthermore, the diagnosis result of the substrate crack can be informed, for example, in the form of the lighting of a predetermined lamp. In addition, the diagnosis of the substrate crack can be performed by the instruction (operation) of a user, or self-diagnosis thereof can be automatically performed at regular intervals.

Structure of Self-Diagnostic Function of IC

In the electro-optical device 1*a* of the present embodiment, the element substrate 10 has the driving IC 5 mounted thereon, and the flexible substrate 7 has a plurality of auxiliary ICs 6, such as a power supply IC, an EPROM, and an IC for driving an LED for a backlight, mounted thereon.

Here, the driving IC 5 is provided with the diagnostic unit 58 and the diagnosis result output unit 59. In the present embodiment, when a command for causing the driving IC 5 to diagnose the ICs 6 is input from the outside to the driving IC 5 through the connector 9 of the flexible substrate 7, the diagnostic unit 58 of the driving IC 5 outputs a command signal to the respective auxiliary ICs 6 to allow information on the normal operations of the respective auxiliary ICs 6, such as a current operation state and an operation history until now, to be input to the driving IC 5. As a result, the auxiliary ICs 6 output signals related to their operations to the driving IC 5, and then the diagnostic unit 58 of the driving IC 5 can output the information or the diagnosis results of the auxiliary ICs 6 based on this information, and information on a normal operation of the driving IC 5, such as a current operation state and an operation history thereof until now, or the diagnosis result of the driving IC 5 based on these information items, from the diagnosis result output unit 59 to the outside through the connector 9 of the flexible substrate 7. In addition, the diagnostic unit 58 can output information on the auxiliary ICs 6 to the data lines 52*a* to display it on the image display region 2. Thus, when a defect occurs in the electro-optical device 1*a*, it is possible to easily determine whether the defect is caused by the auxiliary ICs 6.

Further, even if a plurality of auxiliary ICs 6 is mounted, it is not necessary to provide a self-diagnostic function to each of the plurality of auxiliary ICs 6 and to output the diagnosis result to each of the plurality of auxiliary ICs 6. Therefore, it is possible to perform the diagnosis of the plurality of ICs 5 and 6 with a simple circuit structure. In addition, signal transmission between the outside and the driving IC 5 can be performed using, for example, data buses, which have been used in the related art, and signal transmission between the driving IC 5 and the auxiliary ICs 6 can be performed using, for example, signal lines, which have been used in the related art. Thus, there is an advantage in that a large change in design is not needed.

Furthermore, the diagnosis results of the ICs can be informed, for example, in the form of the lighting of a predetermined lamp. In addition, the self-diagnosis of the ICs can be performed by the instruction (operation) of a user, or can be automatically performed at regular intervals.

Second Embodiment

Figure 5:
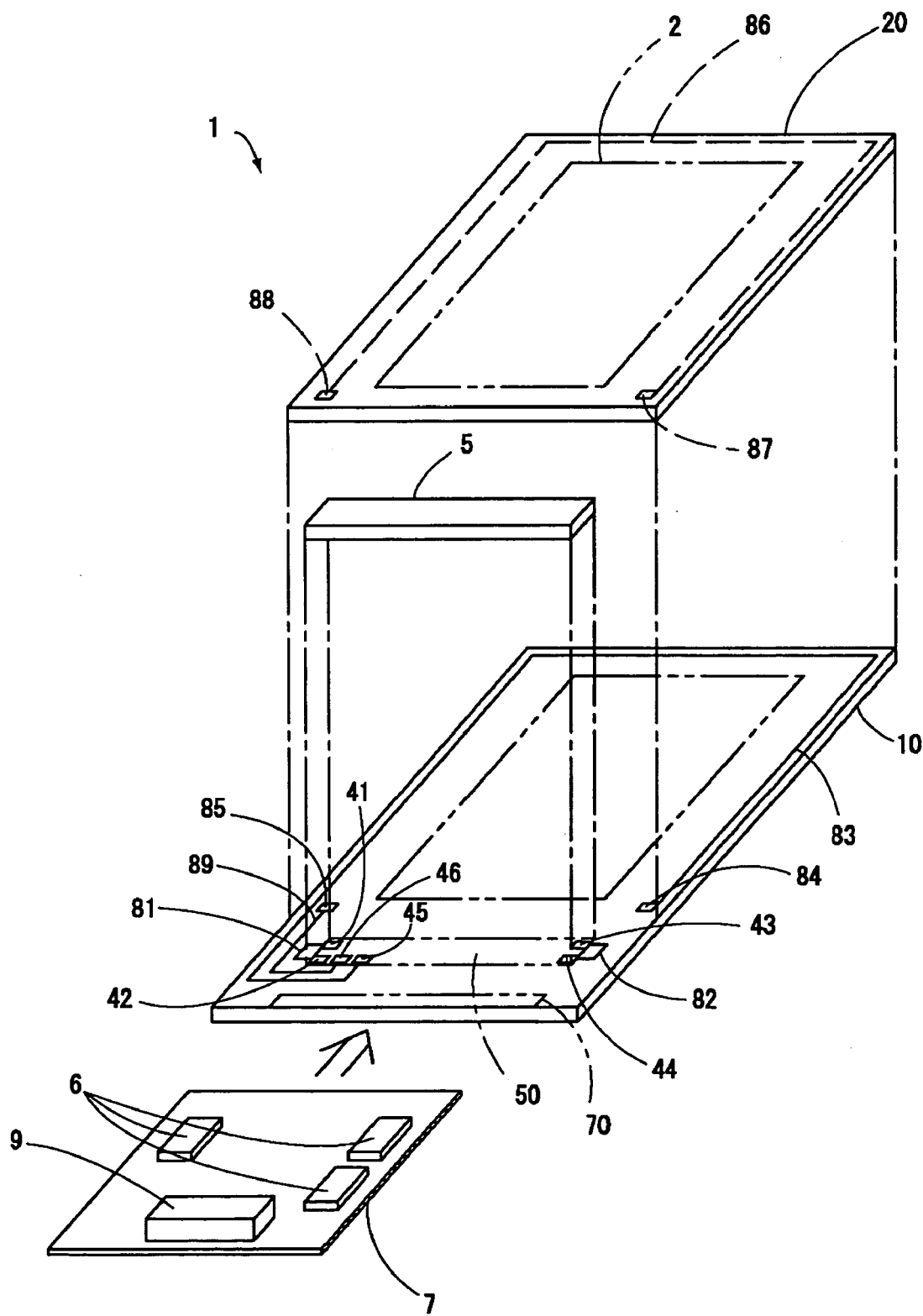
FIG. 5 is an explanatory diagram illustrating a self-diagnostic structure among various components of an electro-optical device according to a second embodiment of the invention.

FIG. 5 is an explanatory diagram illustrating a self-diagnostic structure among various components of an electro-optical device according to a second embodiment of the invention. Since the electro-optical device of the second embodiment has the same basic structure as that in the first embodiment, components having the same functions as those in the first embodiment have the same reference numerals, and thus the description thereof will be omitted.

In the electro-optical device 1*a* shown in FIG. 5, as described in the first embodiment, the element substrate 10, which is the first substrate, and the counter substrate 20, which is the second substrate, are bonded to each other with an intersubstrate conductive material interposed therebetween, so that the intersubstrate connecting terminals are electrically connected to each other. In the present embodiment, of the element substrate 10 and the counter substrate 20, the driving IC 5 and the flexible substrate 7 are mounted on the element substrate 10 only, and the pads 45 and 46, serving as the second substrate crack diagnostic terminal pair, are formed thereon. However, this structure also makes it possible to diagnose the crack of the counter substrate 20.

That is, the pads 45 and 46, serving as the second substrate crack diagnostic terminal pair, are formed adjacent to each other on the element substrate 10. In addition, the substrate crack diagnostic conductive pattern 83 is formed on the element substrate 10 around an outer periphery thereof such that one end of the pattern is connected to the pad 45 and the other end thereof functions as an intersubstrate connecting terminal 85. Further, a substrate crack diagnostic conductive pattern 89 for relay is formed on the element substrate such that one end thereof is connected to the pad 46 and the other end serves as an intersubstrate connecting terminal 85.

On the other hand, a substrate crack diagnostic conductive pattern 86 is also formed on the counter substrate 20 around an outer periphery thereof. Here, one end of the substrate crack diagnostic conductive pattern 86 functions as an intersubstrate connecting terminal 87 at a position overlapping the intersubstrate connecting terminal 84 of the element substrate 10 in plan view, and the other end thereof serves as an intersubstrate connecting terminal 88 at a position overlapping the intersubstrate connecting terminal 85 of the element substrate 10 in plan view.

Accordingly, when the element substrate 10 and the counter substrate 20 are bonded to each other with the intersubstrate conductive material interposed therebetween, the intersubstrate connecting terminals 87 and 88 of the counter substrate 20 are electrically connected to the intersubstrate connecting terminals 84 and 85 of the element substrate 10, respectively. As a result, the substrate crack diagnostic conductive pads 83 and 86 are electrically connected to each other in series between the pads 45 and 46 serving as the second substrate crack diagnostic terminal pair.

Therefore, as described in the first embodiment, the diagnostic unit 58 of the driving IC 5, serving as a substrate crack diagnostic unit, outputs a predetermined signal to the bump 55. At that time, when no crack occurs in the element substrate 10 and the counter substrate 20, so that either of the substrate crack diagnostic conductive patterns 83 and 86 is not broken, the signal output from the diagnostic unit 58 to the bump 55 is input to the diagnostic unit 58 as it is, via the pad 45, the substrate crack diagnostic conductive pattern 83, the intersubstrate connecting terminals 84 and 87, the substrate crack diagnostic conductive pattern 86, the intersubstrate connecting terminals 88 and 85, the substrate crack diagnostic conductive pattern 89, the pad 46, and the bump 56. On the other hand, when a crack occurs in the element substrate 10 or the counter substrate 20, so that the substrate crack diagnostic conductive pattern 83 or 86 is broken, the signal output from the diagnostic unit 58 to the bump 55 is not input from the bump 56 to the diagnostic unit 58. In this way, the diagnostic unit 58 can determine whether a crack occurs in the element substrate 10 or the counter substrate 20, based on whether the substrate crack diagnostic conductive patterns 83 and 86 are broken, and the diagnosis result output unit 59, serving as a substrate crack diagnosis result output unit, can output the diagnosis result to the outside through the connector 9 of the flexible substrate 7. In addition, the diagnostic unit 58 can output the diagnosis result of the substrate crack to the data lines 52a to display it on the image display region 2. Thus, when a defect occurs in the electro-optical device 1a, it is possible to easily determine whether the data lines 52a or the scanning lines 51a are broken due to the crack of the element substrate 10 or the counter substrate 20. In addition, since the other structures of this embodiment are the same as those in the first embodiment, the description thereof will be omitted.

Third Embodiment

Figure 6:
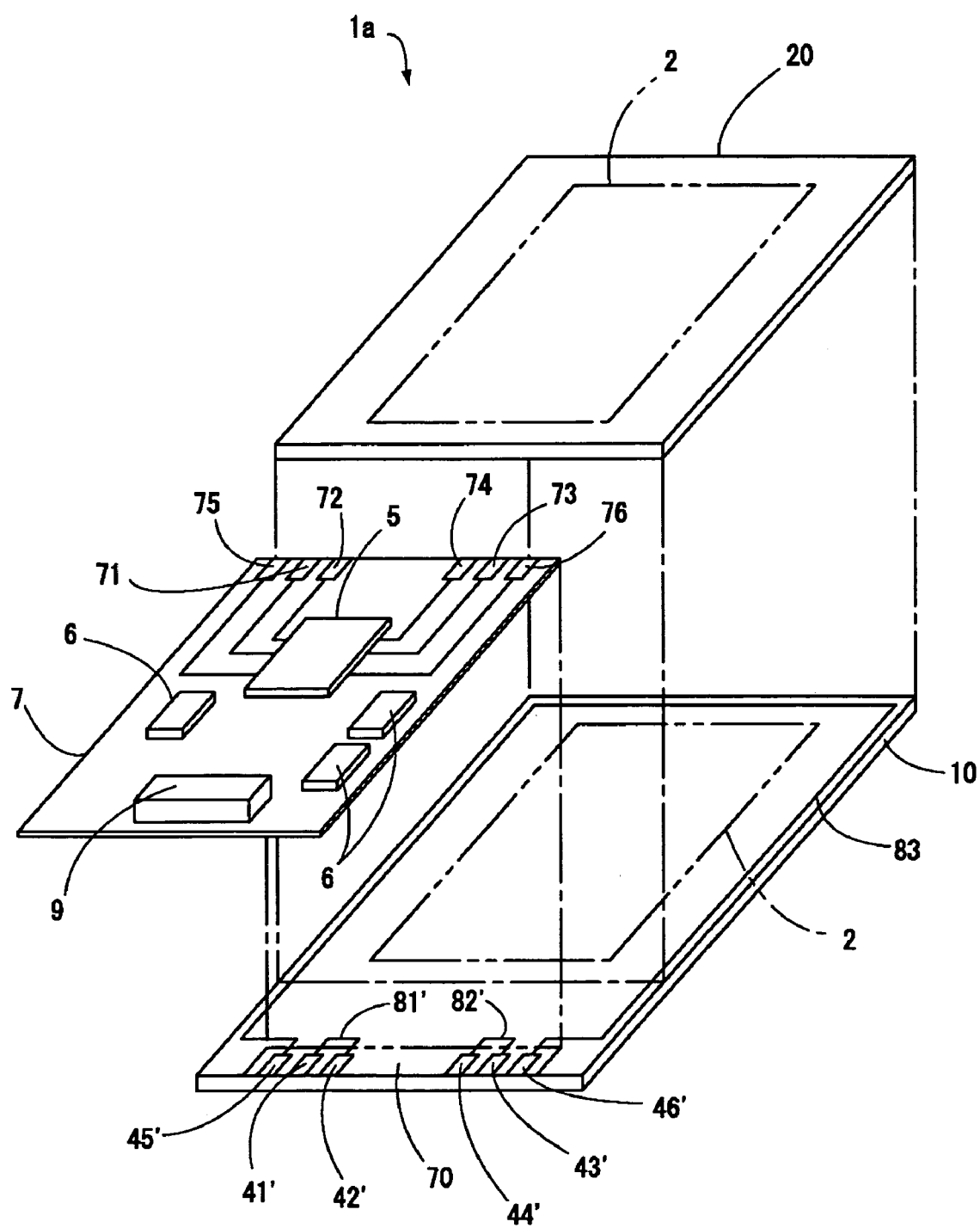
FIG. 6 is an explanatory diagram illustrating a self-diagnostic structure among various components of an electro-optical device according to a third embodiment of the invention.

FIG. 6 is an explanatory diagram illustrating a self-diagnostic structure among various components of an electro-optical device according to a third embodiment of the invention. In the first and second embodiments, the driving IC 5 is mounted on the element substrate 10 in a COG manner. However, in the present embodiment, the driving IC 5 is mounted on the flexible substrate 7 in a COF manner. Here, since the electro-optical device of the third embodiment has the same basic structure as that in the first embodiment, components having the same functions as those in the first embodiment have the same reference numerals, and thus the description thereof will be omitted.

As shown in FIG. 6, in the electro-optical device 1a of the present embodiment, the element substrate 10 has the flexible substrate 7 (the wiring substrate) mounted thereon, and the flexible substrate 7 has the driving IC 5 (the first IC), the auxiliary ICs 6 (the second ICs), and the connector 9 thereon. Therefore, a plurality of mounting terminals (first terminals) for mounting the flexible substrate 7 on the element substrate 10 is provided on the flexible substrate 7, and a plurality of pads (second terminals) for electrical connection between the element substrate 10 and the flexible substrate 7 is formed in a substrate connecting region 70 of the element substrate 10.

In the present embodiment, among a plurality of terminals of the flexible substrate 7, terminals 71, 72, 73, and 74 positioned at both ends thereof are used for diagnosing electrical connection between the terminals of the flexible substrate 7 and the pads of the element substrate 10. In addition, the terminals 71 and 72 constitute a first connection state diagnostic terminal pair, and the terminals 73 and 74 constitute another first connection state diagnostic terminal pair.

On the other side, among a plurality of pads formed on the element substrate 10, pads 41' and 42' connected to the first connection state diagnostic terminal pair composed of the terminals 71 and 72 constitute a second connection state diagnostic terminal pair, and pads 43' and 44' connected to the first connection state diagnostic terminal pair composed of the terminals 73 and 74 constitute another second connection state diagnostic terminal pair. In addition, the pads 41' and 42' are connected to each other by a connection state diagnostic conductive pattern 81' formed on the element substrate 10, and the pads 43' and 44' are connected to each other by a connection state diagnostic conductive pattern 82' formed on the element substrate 10. These connection state diagnostic conductive patterns 81' and 82' are simultaneously formed with the data lines 52a.

Further, similar to the first embodiment, the diagnostic unit 58 is provided in the driving IC 5, and the diagnostic unit 58, serving as a connection state diagnostic unit, outputs predetermined signals to the terminals 72 and 74 and receives signals from the terminals 71 and 73. Therefore, when good connection is made both between the terminal 71 and the pad 41' and between the terminal 72 and the pad 42', the signal output from the diagnostic unit 58 to the terminal 72 is input to the diagnostic unit 58 as it is, via the pad 42', the connection state diagnostic conductive pattern 81', the pad 41', and the terminal 71. On the other hand, when poor connection is made between the terminal 71 and the pad 41' or between the terminal 72 and the pad 42', the signal output from the diagnostic unit 58 to the terminal 72 is not input from the terminal 71 to the diagnostic unit 58. Similarly, when good connection is made both between the terminal 73 and the pad 43' and between the terminal 74 and the pad 44', the signal output from the diagnostic unit 58 to the terminal 74 is input to the diagnostic unit 58 as it is, via the pad 44', the connection state diagnostic conductive pattern 82', the pad 43', and the terminal 73. On the contrary, when poor connection is made between the terminal 73 and the pad 43' or between the terminal 74 and the pad 44', the signal output from the diagnostic unit 58 to the terminal 74 is not input from the terminal 73 to the diagnostic unit 58.

In this way, the diagnostic unit 58 can diagnose the connection state between the terminals and the pads, and the diagnosis result output unit 59, serving as a connection state diagnosis result output unit, can output the diagnosis result to the outside through the connector 9 of the flexible substrate 7. In addition, the diagnostic unit 58 can output the diagnosis result of the connection state between the terminals and the pads to the data lines 52a to display it on the image display region 2. Thus, when a defect occurs in the electro-optical device 1a, it is possible to easily determine whether the defect is caused by the mounting of the flexible substrate 7 on the element substrate 10. In addition, the forming positions of the terminals 71, 72, 73, and 74 (the first connection state diagnostic terminal pairs) on the flexible substrate 7 are not limited to both ends thereof, but the terminals may be formed at a central region of the flexible substrate 7 in the lengthwise direction thereof by a pressing method.

In the electro-optical device 1a having the above-mentioned structure, it is also possible to determine whether a crack occurs in the element substrate 10 in a self-diagnostic manner. That is, in the electro-optical device 1a of the present embodiment, among a plurality of terminals of the flexible substrate 7, terminals 75 and 76 positioned at both ends thereof are used for diagnosing the crack of the element substrate 10, and constitute a first substrate crack diagnostic terminal pair.

On the other side, among a plurality of pads formed on the element substrate 10, pads 45' and 46' connected to the first substrate crack diagnostic terminal pair composed of the terminals 75 and 76 constitute a second substrate crack diagnostic terminal pair. In addition, the pads 45' and 46' are connected to each other by the thin substrate crack diagnostic conductive pattern 83 formed around the outer periphery of the element substrate 10. This substrate crack diagnostic conductive pattern 83 is simultaneously formed with the data lines 52a.

Further, similarly to the first embodiment, the diagnostic unit 58 of the driving IC 5, serving as a substrate crack diagnostic unit, outputs a predetermined signal to the terminal 75 and receives a signal from the terminal 76. Therefore, when no crack occurs in the element substrate 10, so that the substrate crack diagnostic conductive pattern 83 is not broken, the signal output from the diagnostic unit 58 to the terminal 75 is input to the diagnostic unit 58 as it is, via the pad 45', the substrate crack diagnostic conductive pattern 83, the pad 46', and the terminal 76. On the other hand, when a crack occurs in the element substrate 10, so that the substrate crack diagnostic conductive pattern 83 is broken, the signal output from the diagnostic unit 58 to the terminal 75 is not input from the terminal 76 to the diagnostic unit 58.

In this way, the diagnostic unit 58 can determine whether a crack occurs in the element substrate 10, based on whether the substrate crack diagnostic conductive pattern 83 is broken, and the diagnosis result output unit 59, serving as a substrate crack diagnosis result output unit, can output the diagnosis result to the outside through the connector 9 of the flexible substrate 7. In addition, the diagnostic unit 58 can output the diagnosis result of the substrate crack to the data lines 52a to display it on the image display region 2. Thus, when a defect occurs in the electro-optical device 1a, it is possible to easily determine whether the data lines 52a and the scanning lines 51a are broken due to the crack of the element substrate 10.

Further, in the electro-optical device 1a of the present embodiment, it is also possible to diagnose whether a crack occurs in the element substrate 10 in a self-diagnostic manner, similarly to the first embodiment.

Other Embodiments

In the first embodiment, the driving IC 5 and the flexible substrate 7 are connected to the element substrate 10 or the counter substrate 20. However, in a case in which the driving IC and the flexible substrate are connected to both of the element substrate 10 and the counter substrate 20, the invention may be applied to both of the element substrate 10 and the counter substrate 20.

Further, in the above-mentioned embodiments, the invention is applied to an active matrix liquid crystal device, but may be applied to a passive matrix liquid crystal device. In addition, in the above-mentioned embodiments, the invention is applied to a transmissive active matrix liquid crystal device, but may be applied to a reflective or transflective active matrix liquid crystal device. Further, the invention may be applied to the following electro-optical devices shown in FIGS. 7 and 8.

Figure 7:
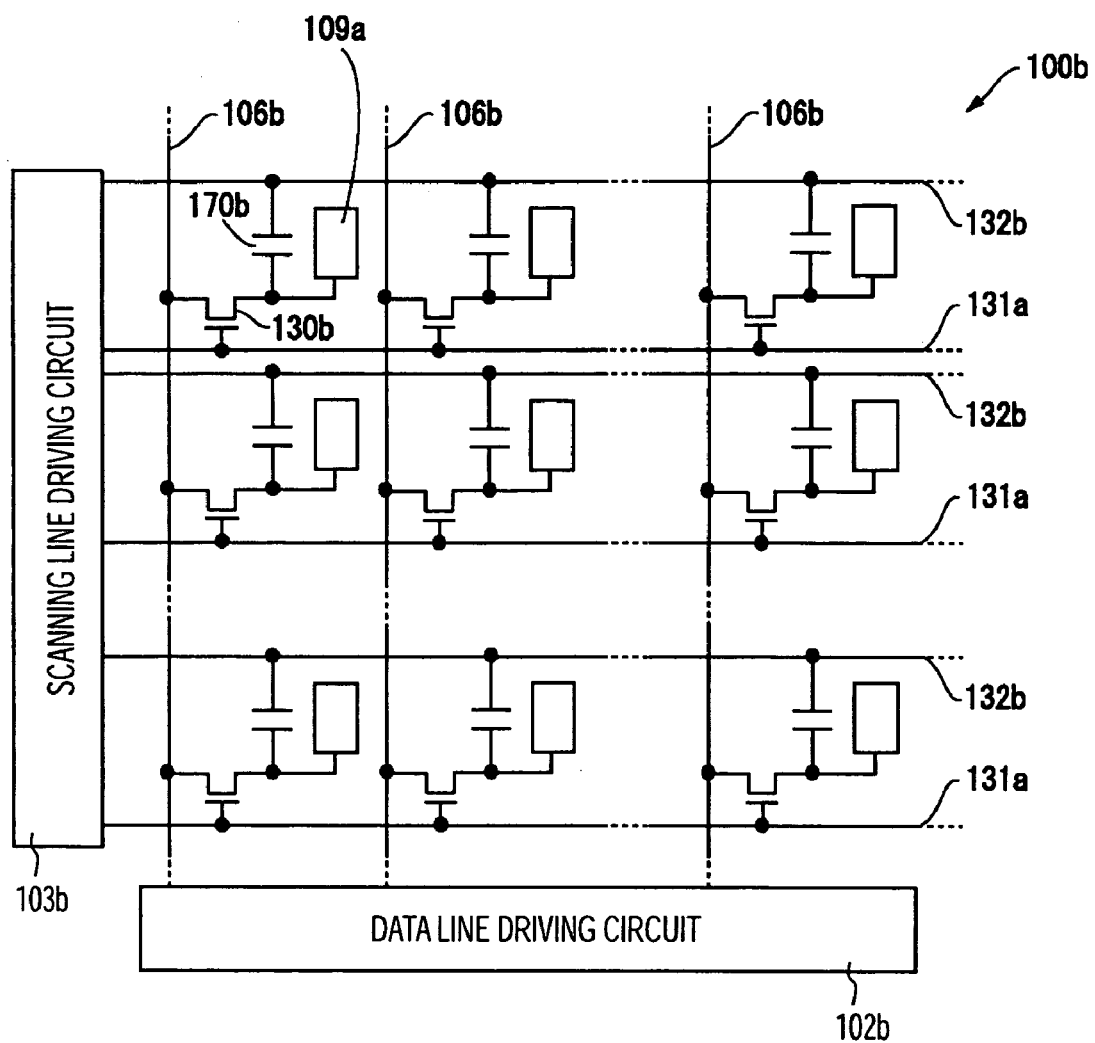
FIG. 7 is a block diagram schematically illustrating the structure of an electro-optical device composed of an active matrix liquid crystal device using thin film transistors (TFTS) as pixel switching elements.

FIG. 7 is a block diagram schematically illustrating the structure of an electro-optical device composed of an active matrix liquid crystal device using thin film transistors (TFTs) as pixel switching elements.

Figure 8:
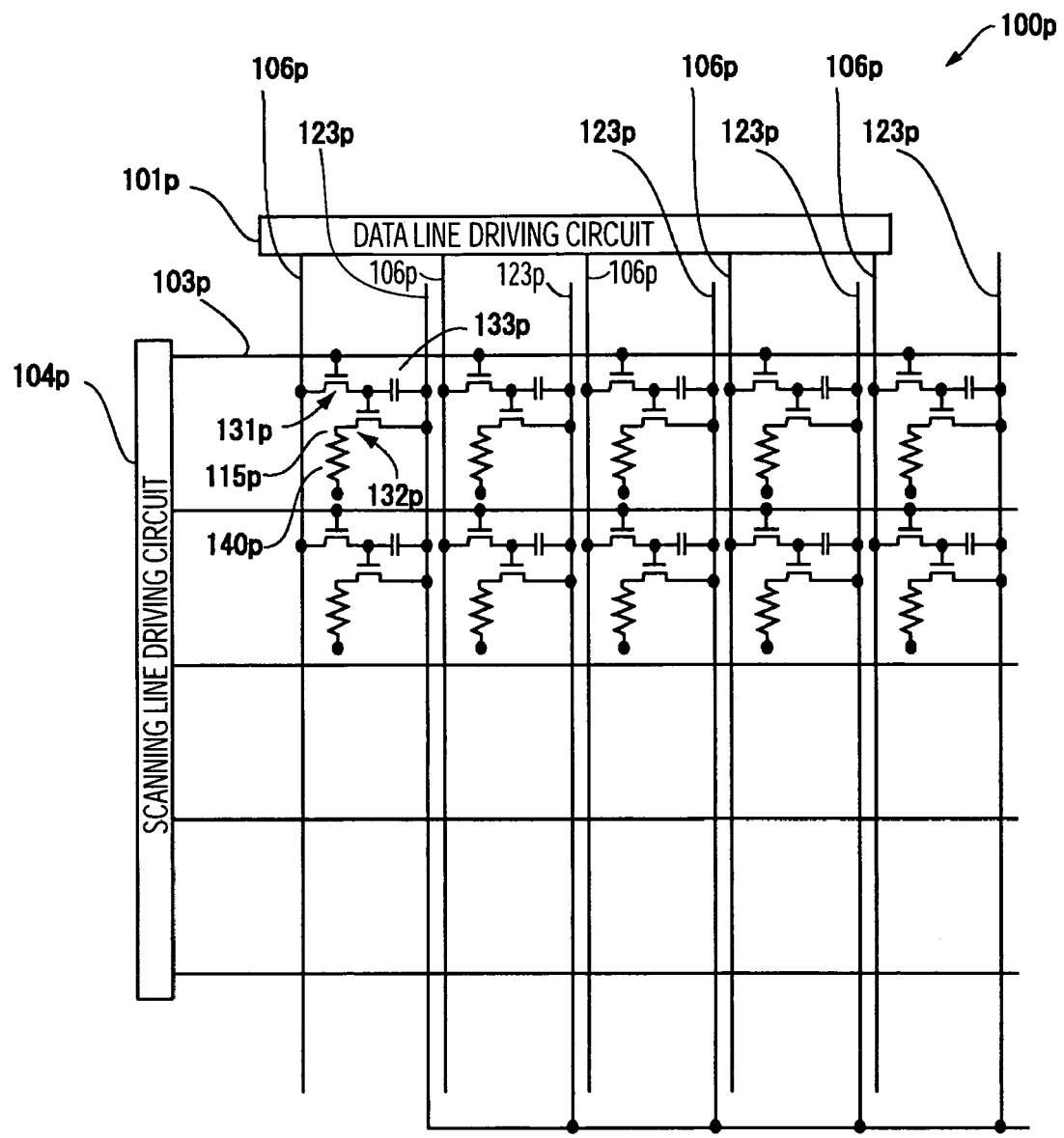
FIG. 8 is a block diagram illustrating an active matrix liquid crystal device having electroluminescent elements in which a charge-injection-type organic thin film is used as an electro-optical material.

FIG. 8 is a block diagram schematically illustrating the structure of an active matrix electro-optical device provided with electroluminescent elements in which a charge-injection-type organic thin film is used as an electro-optical material.

As shown in FIG. 7, in an electro-optical device 100b composed of an active matrix liquid crystal device using TFTS as pixel switching elements, each pixel arranged in a matrix is provided with a pixel switching TFT 130b for controlling a pixel electrode 109b, and each data line 106b for supplying image signals is electrically connected to a source of the TFT 130b. The image signals to be written on the data lines 106b are supplied from a data line driving circuit 102b. In addition, each scanning line 131b is electrically connected to a gate of the TFT 130b, and scanning signals are supplied in pulse from a scanning line driving circuit 103b to the scanning lines 131b at a predetermined timing. The pixel electrodes 109b are electrically connected to drains of the TFTS 130, and the image signals supplied from the data lines 106b are written onto the respective pixels at a predetermined timing by keeping the TFTS 130b, serving as switching elements, an on state for a predetermined period. Sub-pixel signals having predetermined levels that have been written onto liquid crystal through the pixel electrodes 109b are held between the pixel electrodes and a counter electrode formed on the counter substrate (not shown) for a predetermined period. Here, in order to prevent the held pixel signals from leaking, storage capacitors 170b are additionally provided parallel to liquid crystal capacitance formed between the pixel electrodes 109b and the counter electrode. The storage capacitor 170b holds the voltage of the pixel electrode 109b for a period of time, for example, three digits longer than the time when a source voltage is applied. In this way, it is possible to improve charge holding characteristics, and thus to realize an electro-optical device capable of displaying an image with a high contrast ratio. In addition, the storage capacitor 170b may be formed between the pixel electrode and a capacitor line 132b, which is a wiring line for forming capacitance, or may be formed between the pixel electrode and the scanning line 131b in the previous stage.

In the liquid crystal device having the above-mentioned structure, a portion or the entire of the data line driving circuit 102b or the scanning line driving circuit 103b may be provided in an IC mounted on an electro-optical device substrate in a COG or COF manner. Therefore, the invention can be applied to the mounting of an IC. In addition, in this liquid crystal device, since various components are formed on, for example, a glass substrate, the substrate crack diagnostic structure according to the invention can also be applied to the liquid crystal device.

As shown in FIG. 8, an active matrix electro-optical device 100p provided with electroluminescent elements using the charge-injection-type organic thin film is an active matrix display device in which the driving of light-emitting elements, such as light-emitting diodes (LEDs) or electroluminescent (EL) elements that emit light when a driving current flows through an organic semiconductor film, is controlled by TFTS. In addition, since the light-emitting elements used for this type of display device are self-emitting elements, the display device has advantages in that a backlight is not needed and the viewing angle dependence thereof is low.

The electro-optical device 100p shown in FIG. 8 includes a plurality of scanning lines 103p, a plurality of data lines 106p extending in a direction orthogonal to the plurality of scanning lines 103p, a plurality of common feeder lines 123p extending parallel to the data lines 106p, and pixels 115p provided corresponding to intersections of the data lines 106p and the scanning lines 103p. The data lines 106p are connected to a data line driving circuit 101p including a shift register, a level shifter, video lines, and analog switches. The scanning lines 103p are connected to a scanning line driving circuit 104p including a shift register and a level shifter. In addition, each pixel 115p is provided with a first TFT 131p whose gate electrode is supplied with a scanning signal through the scanning line 103p, a storage capacitor 133p for holding an image signal supplied from the data line 106p through the first TFT 131p, a second TFT 132p whose gate electrode is supplied with the image signal held in the storage capacitor 133p, and a light emitting element 140p to which a driving current flows from the common feeder line 123p when electrically connected to the common feeder line 123p via the second TFT 132p. The light emitting element 140*p* is formed by laminating, on the pixel electrode, a hole injecting layer, an organic semiconductor layer, serving as an organic electroluminescent material layer, and a counter electrode made of a metallic material, such as calcium or aluminum containing lithium, in this order. The counter electrode is formed on the data lines 106*p* so as to be placed across the plurality of pixels 115*p*.

In the electroluminescent-type electro-optical device having the above-mentioned structure, a portion or the entire of the data line driving circuit 101*p* or the scanning line driving circuit 104*p* may be provided in an IC mounted on an electro-optical device substrate in a COG or COF manner. Therefore, the invention may be applied to the mounting of an IC. In addition, in such an electroluminescent-type electro-optical device, since various components are formed on, for example, a glass substrate, the substrate crack diagnostic structure according to the invention can also be applied thereto.

Further, in addition to the electro-optical devices described in the above-mentioned embodiments, the invention can be applied to various electro-optical devices, such as a plasma display device, a field emission display (FED) device, a light emitting diode (LED) display device, an electrophoresis display device, a thin cathode-ray tube, a small television using a liquid crystal shutter, and devices using a digital micromirror device (DMD).

The above-mentioned electro-optical device can be used for portable electronic apparatuses, such as a mobile phone and a mobile computer, or for electronic apparatuses having, for example, a direct-view-type display device or a projection display device.

What is claimed is:

1. An electro-optical device comprising:
   a first substrate;
   a first IC that is mounted on the first substrate and that has a plurality of first terminals;
   a plurality of second terminals formed on the first substrate to be connected to the first terminals;
   a plurality of wiring lines formed on the first substrate;
   a pair of first-substrate crack diagnostic terminals that are included in the first terminals and that are used for diagnosing whether a crack occurs in the first substrate;
   a pair of second-substrate crack diagnostic terminals that are included in the second terminals and that are connected to the pair of first-substrate crack diagnostic terminals;
   a substrate crack diagnostic conductive pattern that is electrically connected to each of the pair of second-substrate crack diagnostic terminals and that extends around an outer periphery of the first substrate;
   a substrate crack diagnostic unit provided in the first IC to diagnose whether the pair of first-substrate crack diagnostic terminals are electrically connected to each other; and
   a substrate crack diagnosis result output unit provided in the first IC to output a diagnosis result diagnosed by the substrate crack diagnostic unit.

2. An electro-optical device comprising:
   a first substrate;
   a wiring substrate that is mounted on the first substrate and that has a plurality of first terminals and a first IC;
   a plurality of second terminals formed on the first substrate to be connected to the first terminals;
   a plurality of wiring lines formed on the first substrate;
   a pair of first-substrate crack diagnostic terminals that are included in the first terminals and that are used for diagnosing whether a crack occurs in the first substrate;
   a pair of second-substrate crack diagnostic terminals that are included in the second terminals and that are connected to the pair of first-substrate crack diagnostic terminals;
   a substrate crack diagnostic conductive pattern that is electrically connected to each of the pair of second-substrate crack diagnostic terminals and that extends around an outer periphery of the first substrate;
   a substrate crack diagnostic unit provided in the first IC to diagnose whether the pair of first-substrate crack diagnostic terminals are electrically connected to each other; and
   a substrate crack diagnosis result output unit provided in the first IC to output a diagnosis result diagnosed by the substrate crack diagnostic unit.

3. The electro-optical device according to claim 2, wherein the wiring substrate is a flexible substrate, and the first substrate is a rigid substrate.

4. The electro-optical device according to claim 1, further comprising a second substrate opposite to the first substrate with an electro-optical material interposed therebetween.

5. The electro-optical device according to claim 4, further comprising another substrate crack diagnostic conductive pattern formed on the second substrate, wherein the first and second substrates have intersubstrate connecting terminals, and are bonded to each other with an intersubstrate conductive material interposed therebetween, the intersubstrate connecting terminals are electrically connected to each other by the intersubstrate conductive material, and the substrate crack diagnostic conductive pattern formed on the first substrate and the other substrate crack diagnostic conductive pattern formed on the second substrate are electrically connected to each other between the pair of second-substrate crack diagnostic terminals by the intersubstrate conductive material and the interlayer connecting terminals.

6. The electro-optical device according to claim 4, wherein second IC is mounted on the first substrate or the second substrate, information as to whether the second IC can be normally operated is input from the second IC to the first IC, and the information or diagnosis results of the second IC based on the information is output from the first IC.

7. The electro-optical device according to claim 1, wherein signals output from the first IC are applied to the plurality of wiring lines.

8. An electronic apparatus having the electro-optical device according to claim 1.

9. A mounting structure comprising:
   a first substrate;
   a first IC that is mounted on the first substrate and that has a plurality of first terminals;
   a plurality of second terminals formed on the first substrate to be connected to the first terminals;
   a plurality of wiring lines formed on the first substrate;
   a pair of first-substrate crack diagnostic terminals that are included in the first terminals and that are used for diagnosing whether a crack occurs in the first substrate;
   a pair of second-substrate crack diagnostic terminals that are included in the second terminals and that are connected to the pair of first-substrate crack diagnostic terminals;
   a substrate crack diagnostic conductive pattern that is electrically connected to each of the pair of second-substrate crack diagnostic terminals and that extends around an outer periphery of the first substrate;

a substrate crack diagnostic unit provided in the first IC to diagnose whether the pair of first-substrate crack diagnostic terminals are electrically connected to each other; and a substrate crack diagnosis result output unit provided in the first IC to output a diagnosis result diagnosed by the substrate crack diagnostic unit.

10. A mounting structure comprising:

a first substrate;

a wiring substrate that is mounted on the first substrate and that has a plurality of first terminals and a first IC;

a plurality of second terminals formed on the first substrate to be connected to the first terminals;

a plurality of wiring lines formed on the first substrate;

a pair of first-substrate crack diagnostic terminals that are included in the first terminals and that are used for diagnosing whether a crack occurs in the first substrate;

a pair of second-substrate crack diagnostic terminals that are included in the second terminals and that are connected to the pair of first-substrate crack diagnostic terminals;

a substrate crack diagnostic conductive pattern that is electrically connected to each of the pair of second-substrate crack diagnostic terminals and that extends around an outer periphery of the first substrate;

a substrate crack diagnostic unit provided in the first IC to diagnose whether the pair of first-substrate crack diagnostic terminals are electrically connected to each other; and a substrate crack diagnosis result output unit provided in the first IC to output a diagnosis result diagnosed by the substrate crack diagnostic unit.

* * * * *